US009888553B2

(12) United States Patent
Gruber et al.

(10) Patent No.: US 9,888,553 B2
(45) Date of Patent: Feb. 6, 2018

(54) DEVICE FOR CONTROLLING A PLURALITY OF ELECTRICAL CONSUMERS

(75) Inventors: Stephan Gruber, Chemnitz (DE); Rene Franzky, Chemnitz (DE); Winfried Beyer, Chemnitz (DE)

(73) Assignee: EXSCITRON GmbH, Chemnitz (DE)

( * ) Notice: Subject to any disclaimer, the term of this patent is extended or adjusted under 35 U.S.C. 154(b) by 1140 days.

(21) Appl. No.: 13/502,914

(22) PCT Filed: Oct. 19, 2010

(86) PCT No.: PCT/EP2010/006354
§ 371 (c)(1),
(2), (4) Date: Jun. 7, 2012

(87) PCT Pub. No.: WO2011/047818
PCT Pub. Date: Apr. 28, 2011

(65) Prior Publication Data

US 2012/0242267 A1 Sep. 27, 2012

(30) Foreign Application Priority Data

Oct. 19, 2009 (DE) ........................ 10 2009 049 939
Mar. 3, 2010 (DE) ........................ 10 2010 010 235

(51) Int. Cl.
*H02M 3/18* (2006.01)
*H05B 41/282* (2006.01)
*H05B 33/08* (2006.01)

(52) U.S. Cl.
CPC ..... *H05B 41/2822* (2013.01); *H05B 33/0827* (2013.01); *H05B 41/2827* (2013.01)

(58) Field of Classification Search
CPC ........................................................ H02M 3/18
(Continued)

(56) References Cited

U.S. PATENT DOCUMENTS 3,916,286 A * 10/1975 Waehner ................. H02M 1/14 363/25
4,084,220 A * 4/1978 Akamatsu ........... H02M 5/4505 363/37

(Continued)

FOREIGN PATENT DOCUMENTS

CN 101510723 A 8/2009
DE 102005003021 A1 8/2005

(Continued)

OTHER PUBLICATIONS

English translation of Chinese Office Action for 2010800578581, dated Nov. 28, 2013.
Official action dated Jun. 6, 2012 for DE 10 2010 010 235.0.

*Primary Examiner* — Rexford Barnie
*Assistant Examiner* — Joseph Inge
(74) *Attorney, Agent, or Firm* — Bachman & LaPointe, PC

(57) ABSTRACT

A device for controlling a plurality of electrical consumers to which a constant control current is applied at control nodes. A transformer to which a regulated and/or constant predetermined frequency current is applied at the input end has at least one first and a second winding at the output end which have a common tap, first and second circuit branches forming first and second control nodes for first and second electrical consumers are associated with the first and second windings respectively. The first and second circuit branches each have a magnetically interacting pair of reactors which are wound in opposite relative directions. The first and second reactors of the pair are connected to the first and second control nodes, respectively, via a rectifier. The reactors that are connected to one of the control nodes are oppositely wound. Reactors pairs are magnetically coupled, in particular having a common reactor core.

15 Claims, 5 Drawing Sheets

(58) Field of Classification Search
USPC .......................................................... 307/110
See application file for complete search history.

(56) References Cited

U.S. PATENT DOCUMENTS

| | | | | |
|---|---|---|---|---|
| 4,471,423 | A * | 9/1984 | Hase | H02M 1/14 363/126 |
| 4,952,819 | A * | 8/1990 | Herrmann | H02M 1/32 327/379 |
| 5,936,359 | A | 8/1999 | Gibson | |
| 7,081,709 | B2 * | 7/2006 | Pak | H05B 41/245 315/101 |
| 7,675,242 | B2 * | 3/2010 | Longhino | H05B 41/2827 315/276 |
| 7,744,233 | B2 | 6/2010 | Moriyasu et al. | |
| 7,902,768 | B2 | 3/2011 | Zanforlin | |
| 8,174,225 | B2 * | 5/2012 | Mazumdar | E02F 9/207 318/433 |
| 2006/0255753 | A1 * | 11/2006 | Sawada | H05B 33/0815 315/312 |
| 2007/0024255 | A1 * | 2/2007 | Yasumura | H02M 3/3385 323/267 |
| 2009/0109709 | A1 * | 4/2009 | Nakahori | H02M 3/335 363/16 |
| 2011/0002146 | A1 * | 1/2011 | Kyono | H02M 3/33507 363/21.12 |
| 2012/0043817 | A1 * | 2/2012 | Hartwig | H02M 5/4505 307/73 |

FOREIGN PATENT DOCUMENTS

| | | | | |
|---|---|---|---|---|
| EP | 0587183 | | 3/1994 | |
| EP | 1788850 | A1 | 5/2007 | |
| EP | 1956288 | A1 | 8/2008 | |
| GB | 2128816 | | 5/1984 | |
| WO | 2008035268 | | 3/2008 | |
| WO | WO 2008035268 | A2 * | 3/2008 | H05B 41/2827 |

* cited by examiner

DEVICE FOR CONTROLLING A PLURALITY OF ELECTRICAL CONSUMERS

BACKGROUND OF THE INVENTION

The present invention relates to a device for controlling a plurality of electrical consumers according to the preamble of the main claim. Electrical consumers may have LEDs in the form of strands in particular. On the other hand, the invention includes and claims the act of providing these electrical consumers in the form of electrical consumers which do not have semiconductor-based lamps, in particular no LEDs, and instead are implemented as batteries (in which case the present invention is then embodied to control a plurality of such batteries as a charging device) and additionally or alternatively, the electrical consumers have electric motors, or again alternatively, they may have a plurality of galvanic devices to which a constant electrical current is supplied.

With regard to the state of the art, reference should first be made to the LED technology.

In particular for the purpose of manufacturing intensely bright lights, (high-performance) LEDs in strand form are combined as a series connection, to then be able to deliver the cumulative light intensity (on a suitable carrier). FIG. 2 illustrates such an arrangement, in which a first control node CH1 and a second control node CH2 each represent the switching point for a series connection of a plurality of LEDs (10 per strand here).

The need for achieving a uniform light output of each LED leads to the fact that they are arranged as a series connection in the manner described here; a typical voltage drop of approximately 3.2V with a white LED then results in voltages of approximately 32V being applied per strand in the arrangement illustrated in FIG. 2. From the goal of not exceeding safety limits for low voltages, this leads to the result that multiple strands are carried in parallel, for example, with two strands in the manner illustrated in FIG. 2, when orders of magnitude of 15 to 20 LEDs are exceeded.

However, component tolerances and other manufacturing-related deviations result in the fact that, in the absence of separate measures, parallel circuits of multiple strands will develop voltage differences, the result being an uneven current distribution among the individual strands. This leads to an irregular brightness of the respective LEDs in an advantageous manner and leads to disadvantages in terms of the lifetime of the lamps.

Accordingly, to achieve a uniform luminous efficiency of parallel-connected strands, each having a plurality of LED lamps, it is customary in the state of the art to connect a current regulator upstream from each strand to adjust and/or regulate the current (I1 in strand 1, I2 in strand 2 in FIG. 2) flowing in the strand at the same level.

However, this is complicated because a separate current regulating unit is required for each strand, so that there is a demand for a simplified current regulation for a plurality of parallel strands of LED lamps provided in the form of a series connection, in particular in the field of large-scale manufacturing technology and/or consumer applications. Furthermore, this basic demand exists not only for the LED lamps, which are used only for the context of this problem but instead there is also such a demand for any consumers, typically those such as batteries (to be charged) which receive a constant (regulated) current, electric motors (in particular stepping motors) or galvanic systems. All these consumers as well as additional electrical consumers which are typically operated at a constant current are considered to be "electrical consumers" in the remaining text in the sense of this invention, wherein a preferred implementation form of the invention excludes semiconductor-based lamps, in particular LEDs, from the invention.

The object of the present invention is therefore to simplify a generic device for controlling a plurality of electrical consumers, in particular to reduce the structural complexity and/or hardware complexity, while at the same time providing a circuit which makes it possible to apply a current to the plurality of electrical consumers and to do so in an energy-efficient manner with a minimal power loss.

SUMMARY OF THE INVENTION

This object is achieved by a device for controlling a plurality of electrical consumers to which a constant control current is applied at control nodes. A transformer unit to which a regulated and/or constant current having a predetermined frequency is applied at the input end comprises at least one first and a second winding at the output end which have a common tap, a first circuit branch forming a first control node for a first electrical consumer is associated with the first winding, and a second circuit branch forming a second control node for a second electrical consumer is associated with the second winding. Furthermore, the first and the second circuit branch each have a magnetically interacting pair of reactors which are wound in opposite directions relative to each other, and a first reactor of said pair is connected to the first control node via rectifying means, while a second reactor of the same pair is connected to the second control node via rectifying means. The reactors that are connected to one of the control nodes are wound in opposite directions. The pairs of reactors are magnetically coupled, in particular having a common reactor core.

It is advantageously provided according to the invention that the total current which is kept constant and/or regulated and applied at the primary side is divided between two single individual currents at the secondary side of a main transformer (transformer unit and/or upstream device), it is preferable to provide for the division to be into equal individual currents on the secondary side through suitable identical design of the number of windings (winding numbers) of the windings on the secondary side, such that by adjusting the transmission ratio, a different adjustment may also be made.

According to the invention, a pair of chokes in the manner of a current transformer is now provided in each of the circuit branches on the secondary side, said pair consisting of oppositely wound chokes, which cooperate magnetically with one another (these chokes being provided on a common choke core, for example). Rectifier means, e.g., a diode for half-wave rectification, are then connected downstream from these choke coils in the direction of the first and/or second control nodes for the electrical consumers (FIG. 2), such that a first choke of the choke pair is connected in this way to the first control node and the (oppositely wound) second choke coil of the pair is connected to the second control node via the rectifier means. Accordingly, for the second circuit branch, the first choke is connected to the first control node and the second choke is connected to the second control node, each being rectified, such that the chokes are wired, so that chokes connected to one control node (i.e., one of each of the two pairs) are also oppositely wound.

Since the choke pairs are also magnetically linked to one another, for example, (all of them) also being provided on the same choke core, it is advantageously achieved through such a device that each choke pair in the manner of a current converter divides the current for the half-waves (such that in the preferred case of the same number of windings, this ratio amounts to 1:1, whereas with different numbers of windings, the currents are inversely proportional to the transmission ratio in the choke pair).

The antipole design (i.e., the opposite windings of the individual chokes of a choke pair on a common core) advantageously results in the magnetic fluxes of the windings canceling one another out via the signal characteristic. With regard to the intended current regulation for a plurality of electrical consumers, for example, for controlling the control nodes CH1 and/or CH2 (FIG. 2) and a voltage difference in these strands due to components and/or tolerance, this advantageously leads to the result that the currents introduced by the first and/or second circuit branch into the control nodes still remain constant, just as before, while a voltage difference between CH1 and CH2 magnetizes the core. However, since a suitably repolarized voltage difference occurs with a following half-wave, there is a demagnetization and/or remagnetization that occurs for the core.

Accordingly, for implementation of the invention, a respective choke pair is to be designed and embodied with a respective absolute number of windings per coil according to a maximally occurring voltage difference between the strands and/or a desired maximal deflection of the core (taking into account its geometry).

In the further embodiment according to the invention, this even makes it possible for a control node (and/or a respective electrical consumer) to be short-circuitable by switching a short-circuit to ground (the current thereby increases only by its high-frequency component, which would otherwise be short-circuited by a respective filter capacitor. However, in such a case, the voltage supplied by the main transformer would be only half as great, so then only half the power would be consumed, based on the output current).

It is also advantageous that the principle according to the invention is not limited to providing a choke pair for each circuit branch and/or for each control node. Instead the output signal of a choke pair can be used according to the refinement and in the manner of a cascade to control two additional choke pairs in a suitable manner in turn so that in this way the number of control nodes to be controlled (and also the electrical consumers provided at these control nodes) is increased accordingly. As a result, n electrical consumers may each receive a constant current (and/or an ideally equalized) control current with n−1 divider transformers (wherein such a divider transformer provides two choke pairs on one common core).

As a variant to this cascaded embodiment of the invention, it is provided according to the invention (and has also been claimed independently) to provide an embodiment in the manner of a paired coupling of neighboring channels for the respective control nodes, in which a first choke of a first choke arrangement is connected downstream from the first winding of the transformer unit on the secondary side, this embodiment being connected to the first of the control nodes via rectifying means, and a third choke is connected downstream from the first choke arrangement, which is connected to the second of the control nodes via rectifier means. However, a second choke of the first choke arrangement is connected downstream from the second winding of the transformer unit on the secondary side and is connected to the first of the control nodes via rectifier means, and a fourth choke is connected downstream from the first choke arrangement and is connected to the second of the control nodes via rectifier means. According to the invention, an oppositely wound choke of a second choke arrangement is connected upstream from the second and fourth chokes, such that this second choke arrangement is connected to the two individual chokes between the first and/or second winding on the secondary side and the first choke arrangement. The chokes of the second choke arrangement are advantageously wound in opposite directions from one another according to the invention, likewise with the chokes of the first choke arrangement which are connected to a respective one of the control nodes being wound in opposite directions from one another (i.e., for example, the first choke and the second choke of the first choke arrangement, which are connected to the first control node). In addition, the chokes of the respective choke arrangements are also advantageously interconnected magnetically according to the invention, especially advantageously being provided on a common choke core.

In an inventive refinement of this variant of the invention, it is also possible to galvanically separate the respective control nodes (and/or the respective circuit branches, i.e., chokes of the first and/or second choke arrangements connected upstream from the control node). To this end, the transformer unit has a plurality of first and second windings on the secondary side, each being assigned to these branches and separated from one another and/or insulated from one another.

According to an especially favorable variant of the invention, for which protection is claimed independently, only one winding is present on the secondary side of the main transformer. Here again, providing a choke pair (magnetically linked together) in the manner described here also leads to the desired result, but with such a simplified (and asymmetrical) topology, one must ensure that the magnetization of the core occurring due to voltage differences is suitably demagnetized. Within the scope of this aspect of the invention, it is therefore advantageous to provide a demagnetizing unit with an auxiliary winding, which leads to a demagnetization potential, more preferably with the help of a (bridge) rectifier or this auxiliary winding with a center tap and two-way rectification, which thus causes the demagnetization of the core; in the exemplary embodiment described above, this was accomplished through the alternating half-waves in a normal-mode configuration and/or a center tap of the secondary winding.

Within the scope of the invention, it is preferable to implement the plurality of electrical consumers according to the invention not as LEDs, but instead to provide as electrical consumers only those consumers which do not have any semiconductor-based lamps, in particular no LEDs. It is especially preferred according to the invention to provide a plurality of (rechargeable) batteries as the plurality of electrical consumers, such that in this case the device according to the invention may be implemented as a charger. Alternatively, it is provided within the scope of preferred implementations of the invention to provide the plurality of electrical consumers in the form of a plurality of (electric) motors, in particular as stepping motors, which receive a constant current in the manner according to the invention. Furthermore, according to the invention, it is provided within the scope of preferred further embodiments of the invention that the plurality of electrical consumers is to be embodied as devices for galvanics and/or galvanic treatment of workpieces which receive the constant current in the manner according to the invention.

BRIEF DESCRIPTION OF THE DRAWINGS

Additional advantages, features and details of the invention are derived from the following description of preferred exemplary embodiments as well as on the basis of the drawings, which show.

DETAILED DESCRIPTION

Figure 1:
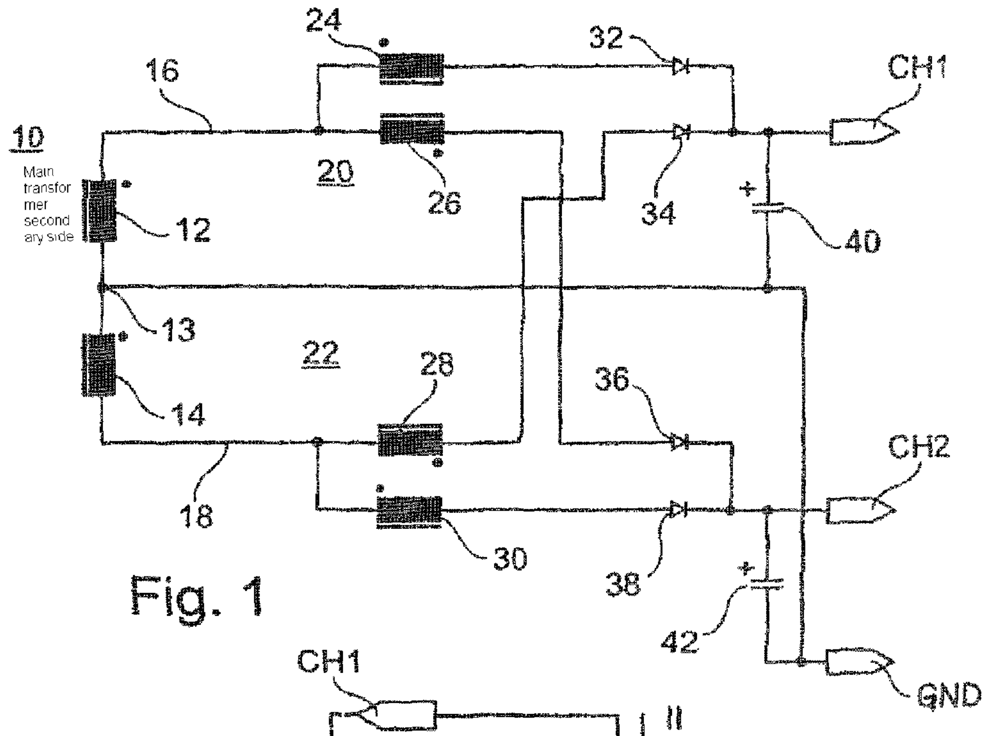
FIG. 1 a schematic wiring diagram of the device for controlling a plurality of electrical consumers according to a first exemplary embodiment of the invention.

FIG. 1 illustrates the essential components of the first exemplary embodiment of the invention. A pair of secondary windings 12, 14, which are joined to one another via a center tap 13 and form circuit branches 16 and/or 18, is formed on the secondary side of a main transformer 10. A throttle pair 20 consisting of a pair of oppositely wound throttles 24, 26 on a common core are provided in the upper circuit branch 16 (the dots in the wiring diagram indicate the direction of winding in a manner which is otherwise known). Similarly, a throttle pair 22 consisting of the individual oppositely wound throttles 28, 30 is provided for the second circuit branch 18. In the present exemplary embodiment with identical secondary windings 12, 14 with regard to the number of windings as well as with the same number of windings of the throttles 24 to 30, there is thus a symmetrical arrangement to this extent. All of the individual throttles 24, 26, 28, 30 are formed by means of a common throttle core and cooperate magnetically to this extent.

Figure 2:
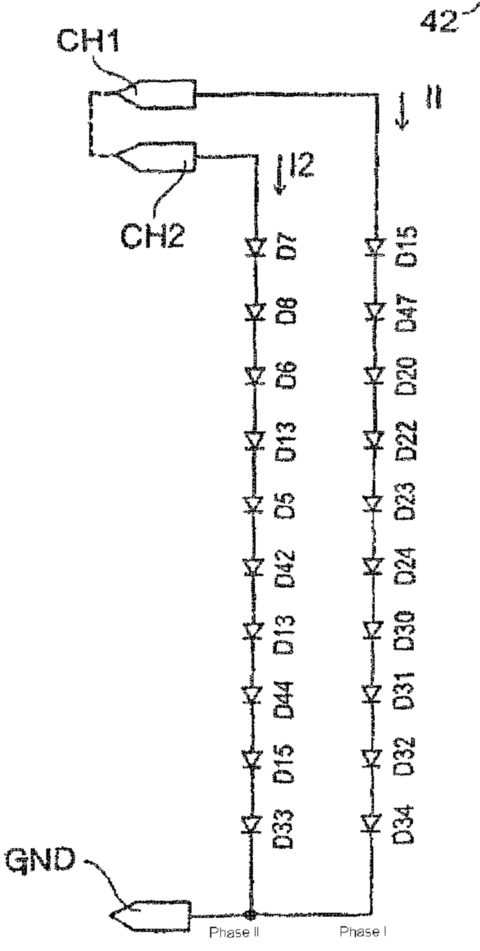
FIG. 2 a schematic line diagram to illustrate two electrical consumers provided parallel to one another.

As further illustrated by the diagram in FIG. 1, one output (pole) of the choke 24 is connected to the first control node CH1 via a rectifier diode 32 (FIG. 2), such that this control node is connected to ground (GND) across a filter capacitor 40. The second choke 26 of the first choke pair 20 is connected to the control node CH2 via a corresponding rectifier diode 36; this control node also has a high-frequency connection to ground across a filter capacitor 42.

Similarly and symmetrically with the first choke pair 20, the individual chokes 28, 30 of the second choke pair 22 lead over rectifier diodes (rectifier means) 34, 38 to the control nodes CH1 and/or CH2. It can be seen from the diagram in FIG. 1 that the individual chokes (e.g., 24, 28 for CH1) leading to a control node are also wound oppositely from one another (likewise the individual chokes 26, 30 with regard to CH2).

During operation, the device shown here is supplied with a regulated and/or constant primary current on the primary side (in the manner of a conventional upstream device), such that this primary current then flows alternately in the secondary windings 12, 14 and/or in the branches 16 and 18 thus formed, depending on which half-wave is prevailing. The respective choke pairs 20 and/or 22 then act in the manner of a current transformer, such that the current in branch 16 is divided among the chokes 24, 26 (at an assumed winding ratio of 1:1). The magnetic fluxes of the windings cancel one another due to the opposing polarity. A similar situation applies to choke pair 22 in branch 18. It is advantageously found that although a voltage difference from CH1 to CH2 (each relative on ground) produces magnetization of the core, this is compensated and/or canceled with a subsequent repolarized half-wave.

In the exemplary embodiment shown here of a frequency of the applied current in the range between approximately 100 and 200 kHz (a range between 30 and 500 kHz is conceivable) and a maximum voltage at CH1 and/or CH2 in the range between approximately 40 and 50V (usually corresponding to 10 to 15 LEDs per strand), the chokes 24 to 30 have typical winding numbers from a few up to hundreds. Filter capacitors 40 and/or 42 are within the range of 1 μF to 10 mF.

In a refinement of the exemplary embodiment of FIG. 1, it is possible to modify the number of windings of the chokes, such that the number of windings must be the same for the respective half-waves to one control node, i.e., the number of windings of the choke 24=the number of windings of the choke 28, and the number of windings of the choke 26=the number of windings of the choke 30. The ratios of these numbers of windings to one another then defines the ratio of the currents in the control nodes, i.e., winding ratio of choke 24 to winding ratio of choke 26=I2 (in CH2):I1 (in CH1).

Figure 3:
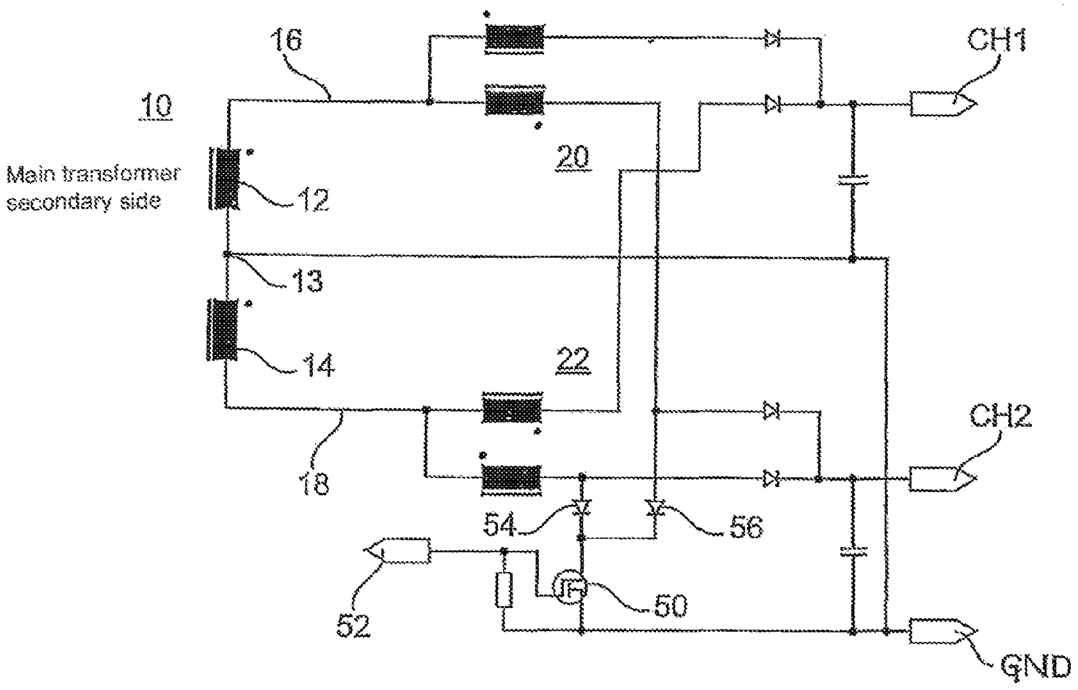
FIG. 3 a modification of the exemplary embodiment of FIG. 1 by a short circuit and/or dimmer unit assigned to one of the two control nodes.

FIG. 3 illustrates a preferred and advantageous modification of the exemplary embodiment of FIG. 1. With otherwise the same components, a short-circuit unit is connected downstream from the chokes 26 and/or 28 for the node CH2, said short-circuit unit consisting essentially of an FET 50 as a switching element controlled at its gate 52, such that decoupling diodes 54, 56 are assigned to the choke outputs.

Then a clocked and/or periodic and/or modulated control of the gate terminal 52, for example, permits dimming of the LED strand connected at CH2, in that a short-circuit to ground takes place in accordance with the "on" time of the FET 50, and this portion of the current, which is tapped off to ground, is no longer available for the CH2.

The transistor 50 also permits voltage regulation, e.g., by the fact that the transistor 50 influences the charging and/or discharging performance of the capacitor 42 (for example, between two control values) through its switching behavior. If the modulation and/or an on:off pulse duty factor at the switching input 52 of the transistor 50 is/are altered, the strand current (I2 to CH2 here) can be adjusted suitably between 0 and 100% preselected rated value. The current in the other strand (CH2) remains unchanged in this configuration as long as the current supplied by the main transformer 10 remains constant.

If in a variation of the principle of FIG. 3, the filter capacitor is shifted to the primary side (not shown) of the main transformer, then a simplification in the technical circuitry, namely removal of the capacitors, is possible on the secondary side such that the short-circuit switch (transistor 50) can then be connected directly to the output even without the decoupling diodes shown (54, 56).

Figure 4:
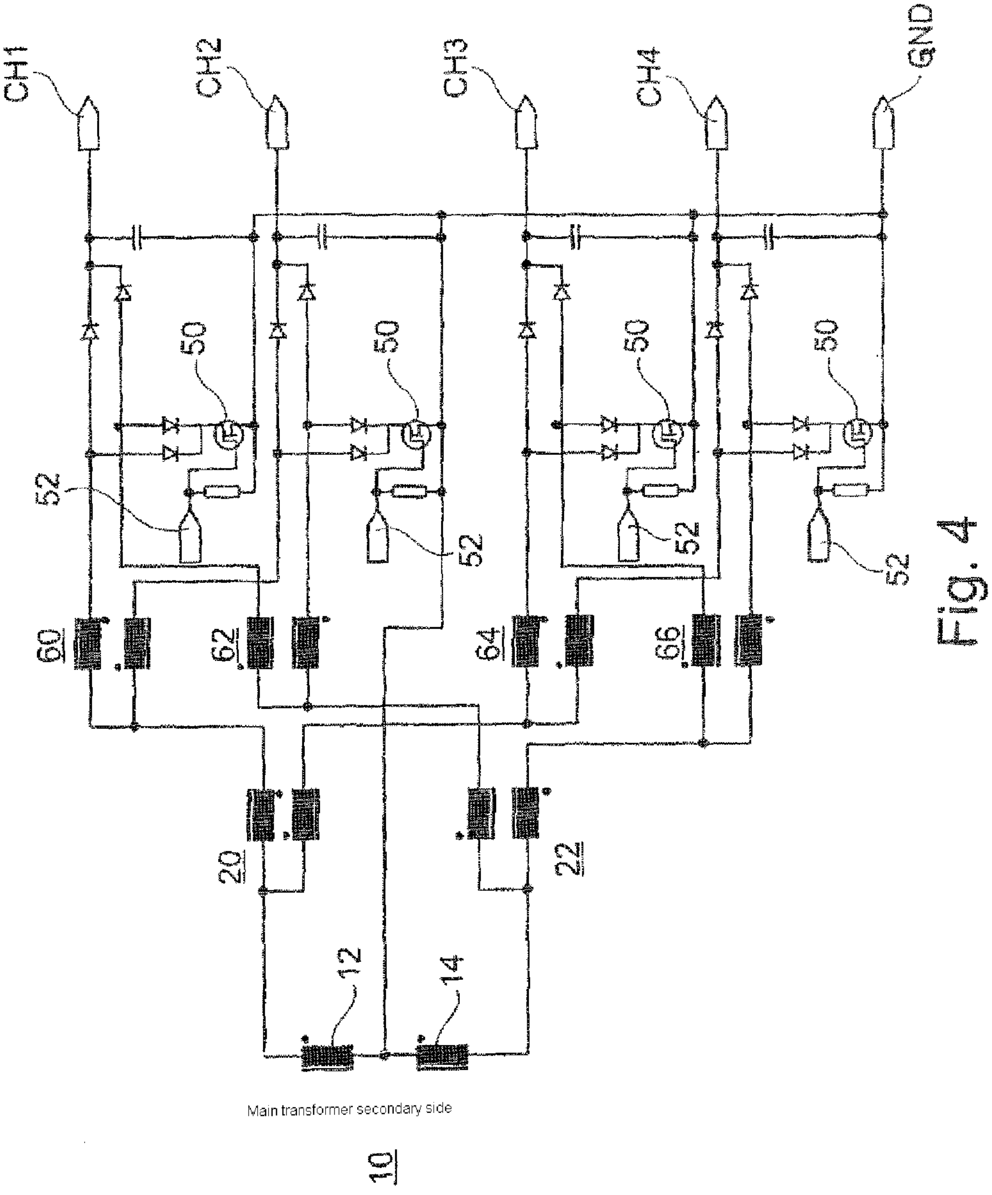
FIG. 4 a further embodiment of the exemplary embodiment of FIG. 1 in a cascaded two-stage system of choke pairs for controlling four electrical consumers.

FIG. 4 illustrates another modification in the form of a cascade.

Additional choke pairs 60, 62, 64, 66 are provided here, such that the choke pairs 20, 22 sit on a common core (in continuation of the exemplary embodiment of FIG. 1 in a cascaded form), ditto for the choke pairs 60, 62 having a common core and choke pairs 64, 66 having a common core. The individual chokes of the choke pairs 60 to 66 are again wound oppositely, and in the exemplary embodiment of FIG. 4, a separate short circuit according to FIG. 3 is assigned to each strand (thus control nodes CH1 to CH4), so there is the greatest possible flexibility in wiring and/or modulation of the gate terminals 70 to 76.

If the choke pairs 20, 22 as well as 60, 62 and 64, 66 are each interpreted as divider transformers, then a current regulation for a total of four strands and/or control nodes can be implemented with a total number of three divider transformers, or an implementation of n strands by n−1 divider transformers in generalized form.

The principle shown here is possible with any normal-mode main converter circuits including half bridge, full bridge, resonant converter, M circuit, etc.

For example, if the respective diodes are reversed in polarity as an example of an output, then a negative output voltage is applied at the corresponding control node and/or a negative output current flows. This current corresponds in amount to the positive current and can be adjusted as described above by stipulating corresponding transmission ratios. For example, if the polarity of the diodes (70, 72) is reversed for the control node CH4 (FIG. 4), then CH4 is negative with regard to current and voltage accordingly. The polarity of the decoupling diodes (74, 76) should also be reversed for the switching transistor (50) in this branch, in which case this short-circuit switch would then be implemented as a P channel transistor.

A current flows here through the upper winding (64), then the same current also flows through the lower winding of the pair (66), but in the opposite direction, for example, during the positive half-wave. Since these two windings have the same direction of winding but the currents are now opposite from one another, the principle described above is applicable. In the preceding divider stage (windings 20 and/or 22), the magnetic fluxes are added up and the windings 20 (lower winding) and 22 (lower winding), the direction of winding and the currents are in opposition and advantageously create the balance with the current in the winding 20 (above) according to the invention.

It follows that the absolute current division is maintained in the manner provided according to the invention again in this case of an output with a reversed polarity.

Figure 5:
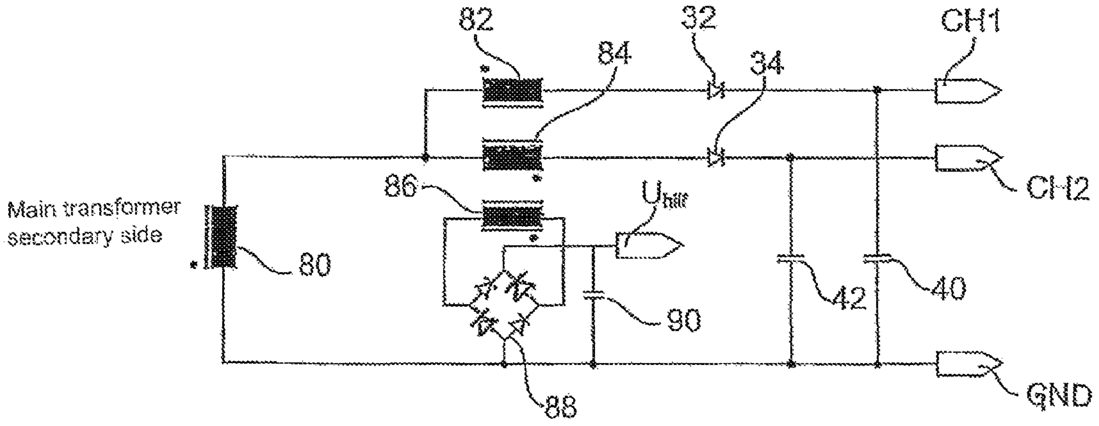
FIG. 5 a variant of the invention with only one winding of the main transformer on the secondary side such that the choke pair assigned to the first and/or second control node(s) additionally cooperates with an auxiliary winding for demagnetization.

FIG. 5 illustrates another modification of the basic principle of FIG. 1, but in a further simplification, this turns away from the normal-mode principle of FIG. 1 (in which both half-waves of the main transformer signal are advantageously utilized and in particular can also be used for demagnetization). In a further simplified exemplary embodiment of FIG. 5, the secondary side has only one winding 80, downstream from which a choke pair (oppositely wound) 82, 84 on a common core is connected and in turn leads over rectifier diodes 32, 34 to the control nodes CH1, CH2. Again, filter capacitors 40, 42 ensure a high-frequency ground connection.

However, since there is a magnetization of the choke core (which would not be demagnetized in the half-wave of the opposite polarity, as with the normal-mode circuit described above) due to the single-cycle implementation of FIG. 5 and the potentially irregular voltages on CH1 and/or CH2, a demagnetization is implemented in the form of an auxiliary winding 86 connected to a bridge rectifier 88 and a filter capacitor 90 to an auxiliary potential $U_{hilf}$.

The demagnetizing winding 86 may also be fed back to the primary side (with appropriate insulation).

The principle illustrated in FIG. 5 functions with single-cycle flux converters as well as flyback converters. With all types of flux converters (including normal-mode), a choke with a demagnetizing diode also sits between the rectifier and the filter capacitor. The embodiment according to FIG. 5 can also be refined by means of the regulation and/or dimming of FIG. 3.

Figure 6:
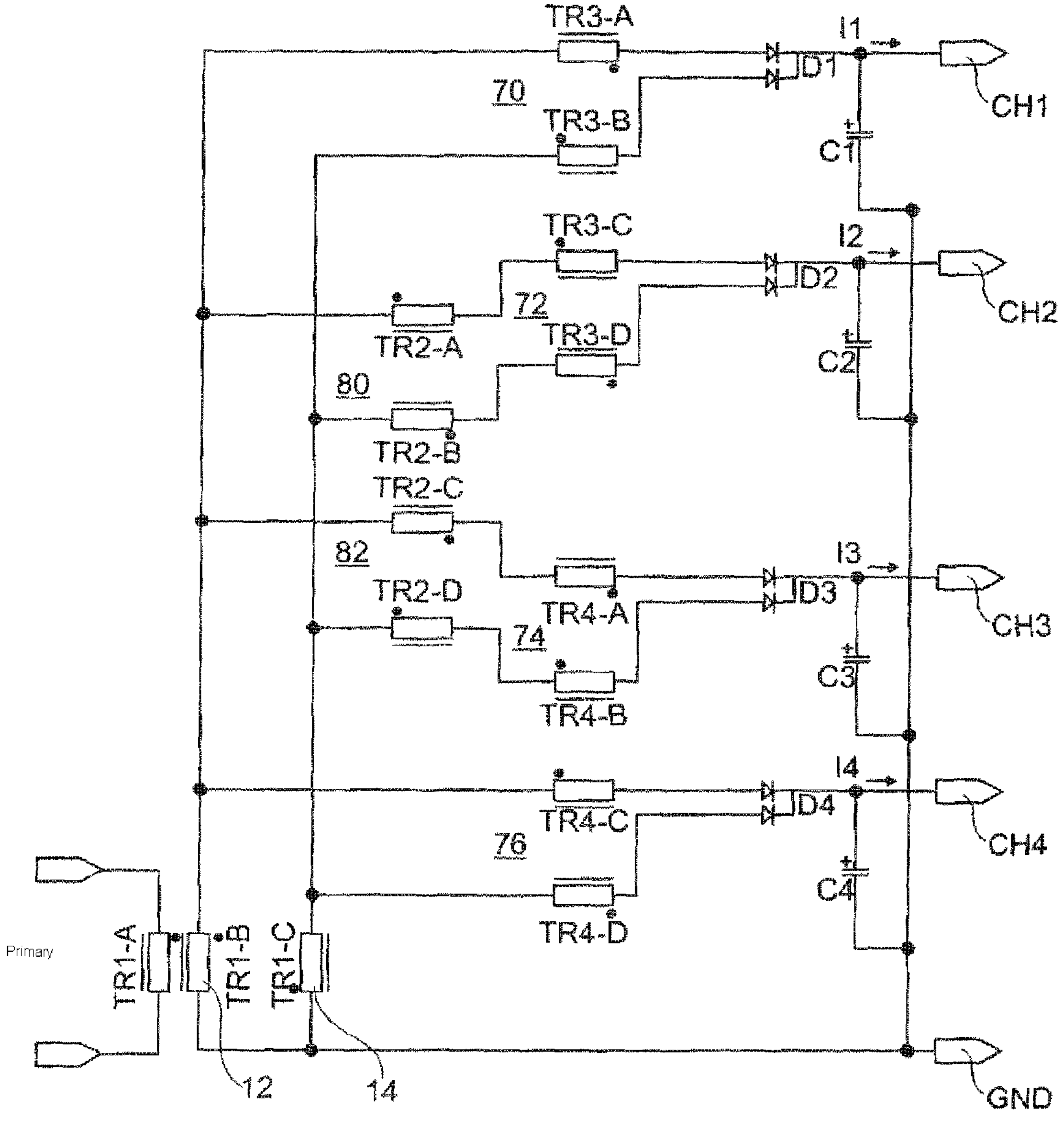
FIG. 6 an embodiment of the invention as a variant of FIG. 4, in which, instead of a cascaded system, a paired coupling of neighboring channels is performed and FIG. 7 a further embodiment of the exemplary embodiment of FIG. 6 in which separate first and/or second windings of the (main) transformer on the secondary side are provided for each respective channel of a control node in order to separate the circuit branches thereby formed from one another.
Figure 7:
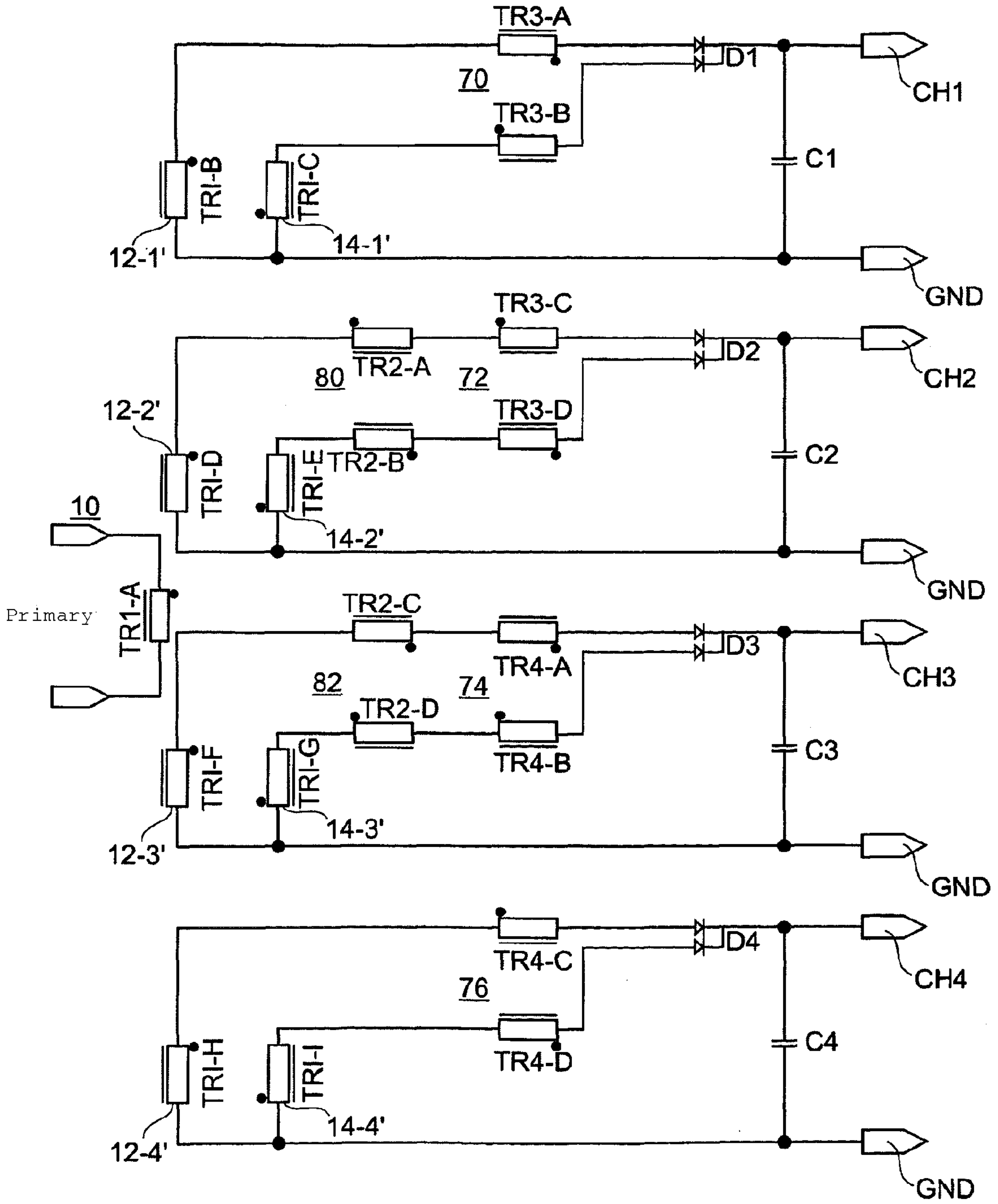

FIGS. 6 and 7 show another implementation of the invention which represents a variant through coupling of neighboring channels in comparison with the cascaded design of the invention according to FIG. 4.

In concrete terms the transformer unit 10 again has two windings 12 and/or 14 on the secondary side which have a shared tap to ground GND.

As also shown from the diagram in FIG. 6, each of the windings 12, 14 leads to one of the four control nodes CH1 to CH4, which in turn, as in the manner described above, offer a current division and/or current limitation for electrical consumers (not shown), which can be connected there. To be more specific, with regard to the control nodes CH1, a choke pair 70 (referred to as TR3-A and TR3-B in the wiring diagram) is connected upstream as a rectifier means via diodes D1, this choke pair sitting on a common core and wound oppositely from one another. Two other individual chokes of a choke pair 72 (TR3-C and TR3-D in the wiring diagram) are also part of the same choke arrangement, sit on the same core and to this extent form part of a branch directed at the second control node CH2 (again via rectifiers D2). A choke pair of a second choke arrangement is connected upstream from the choke pair 72, a first choke TR2-A leading to the first winding 12 on the secondary side and a second choke TR2-B of the pair 80 leading to the second winding 14.

With regard to a further choke arrangement consisting of choke pairs 74 (for the third control node CH3) and 76 (for the fourth control node CH4) the exemplary embodiment of FIG. 6 is designed symmetrically (based on the first choke arrangement with the pairs 70, 72). Again the choke pairs 74, 76 sit on a common core. Chokes of a choke pair 82 are connected upstream from the choke pair 74 such that the choke pair 82 together with the choke pair 80 forms a separate choke arrangement (again on a common core) as described above.

The respective choke arrangements 70, 72 and 74, 76 as well as 80, 82 have a transmission ratio of 1:1. As a result a current I1 to the first control node CH1 is equal to the current I2 to the second control node CH2. The additional choke arrangements are designed accordingly, such that the choke arrangement (transformer) 80, 82 ensures that I2=I3, and the choke arrangement 74, 76 (transformer) ensures that I3=I4 accordingly.

As a result, it holds that I1=I2=I3=I4, so that each output current in one of the control nodes CHi (i=1 to 4) has a quarter of the value predetermined by the main transformer 10 (and/or its control on the primary side).

The wiring diagram in FIG. 6 shows that the transformer with the choke pairs 80, 82 acts in principle like the choke arrangement with the choke pairs 20, 22 in the exemplary embodiment of FIG. 4. Fundamentally, windings that operate with the same phase angle of the input signal (i.e., the upper or the lower individual choke of the pairs 80, 82 in FIG. 6) are formed with opposite directions of winding. This is also true of individual windings leading to a shared control node, as is the case for the individual chokes of the pair 70, 72, etc.

The circuit principle of the exemplary embodiment of FIG. 6 can also be expanded to any desired number of other channels. Like the principle described above, n−1 divider transformers (i.e., choke arrangements in the sense described above) are necessary for n output channels, as in the exemplary embodiment of FIG. 4. It is likewise possible for the principle of the invention of FIG. 6 to include individual dimming by channels via additional decoupling diodes as well as a short-circuit switch (reference numerals 50, 52 in FIG. 4).

If an output signal (control node) has one current value that is different from the others, then the transmission ratio of the choke arrangements connected to the respective control node is to be adjusted, wherein the aforementioned rules are applicable. For example, if a different current value flows in the node CH2 in the circuit of FIG. 6 than in the nodes CH1, CH3, CH4, then the transmission ratio of the choke pair 80:82 must be the same as the transmission ratio of the choke pair 72:70 in order to set a different current I2.

Within the context of the preferred refinements of the invention, it is also possible to combine the principles of the exemplary embodiment of FIG. 4 (cascading) and/or of FIG. 6 (paired wiring) with one another. For example, it is possible that one output (control node) of the circuit of FIG. 6 is divided with another distributor transformer (choke arrangement) into two channels, as shown in FIG. 1. Likewise, one output (control node) of the circuit from FIG. 4 may supply the arrangement according to FIG. 6, for example, and then this output may be divided among four channels.

FIG. 7 shows a variant of the exemplary embodiment of FIG. 6, wherein the same reference numerals denote corresponding matching circuit components. In contrast with FIG. 6, the current divider circuit on the secondary side is divided into a plurality of circuit branches separated (galvanically) from one another, channel by channel, such that each circuit branch is assigned to one of the control nodes for the consumers to be allocated and each has a (separate) winding pair of the main transformer on the secondary side, referred to in the example of FIG. 7 as 12*i*' and/or 14*i*' (where i=1 to 4 according to the respective circuit branch).

Due to this division of the main transformer 10 into a plurality of mutually insulated secondary windings, there is a magnetic decoupling of the four channels shown. A similar phase angle is to be ensured for each channel according to the allocation and design of the windings 12, 14 of FIG. 6 on the secondary side.

The invention claimed is:

1. A device for controlling a plurality of electrical consumers, which receive a constant control current (I1, I2) at respective control nodes (CH1, CH2), comprising:

a transformer unit (10) which receives a regulated or constant current at a predetermined frequency on the primary side and has at least one first winding (12) and a second winding (14) on the secondary side having a shared tap (13), a first circuit branch (16) forming a first control node (CH1) for a first electrical consumer is assigned to the first winding, and a second circuit branch (18) forming a second control node (CH2) for a second electrical consumer is assigned to the second winding, the first and the second circuit branches each have a mutually oppositely wound and magnetically cooperating choke pair (20, 22), wherein a first choke (24; 28) of the choke pair is connected to the first control node via rectifiers (32; 34), and a second choke (26; 30) of the same choke pair is connected to the second control node via rectifiers (36; 38), with chokes connected to one of the control nodes wound oppositely from one another, and the choke pairs being magnetically coupled and having a common choke core, wherein the first electrical consumer and the second electrical consumer are not connected in parallel.

2. The device according to claim 1, wherein the transformer unit has two windings (12, 14) on the secondary side with a center tap (13) to form the first and second circuit branches for a positive and negative half-wave of the signal transmitted.

3. The device according to claim 1, wherein the chokes assigned to one control node have the same number of windings.

4. The device according to claim 1, wherein the chokes of a choke pair have the same number of windings.

5. The device according to claim 1, wherein according to the predetermined frequency, the control nodes are connected to ground potential (GND) via capacitance means (40, 42).

6. The device according to claim 5, wherein the capacitance means are connected downstream from the rectifiers.

7. The device according to claim 1, wherein a choke pair (60; 62; 63; 66) having a first and a second choke is connected downstream from each choke of a choke pair (20; 22) in the manner of a cascade.

8. The device according to claim 1, wherein short-circuit means (50, 52, 54, 56) which are connected at the output end to the at least one choke (26, 30) assigned to the circuit nodes (CH2), so that the choke output upstream from the rectifiers is connected to ground potential in response to a first control of the short-circuit means.

9. The device according to claim 8, including PWM-modulated control of the short-circuit means.

10. A device for controlling a plurality of electrical consumers which receive a constant control current at the respective control nodes (CH1, CH2), comprising:

a transformer unit receiving a regulated and/or constant current of a predetermined frequency on the primary side and having a winding (80) without a tap on the secondary side, a first circuit branch forming a first control node (CH1) for a first electrical consumer and a second circuit branch forming a second control node (CH2) for a second electrical consumer being assigned to the winding, the first and the second circuit branches having a pair of oppositely wound and magnetically cooperating chokes (82, 84), wherein a first choke (82) of the choke pair is in contact with the first control node via rectifiers (32), and a second choke (84) of the same choke pair is applied to the second control mode via rectifiers (34), and a demagnetizing unit having an auxiliary winding (86), which cooperates magnetically with the choke pair is assigned to the choke pair.

11. The device according to claim 10, wherein the auxiliary winding has a rectifier unit (88), in particular a bridge rectifier unit connected to a demagnetizing potential ($U_{hilf}$).

12. A device for controlling a plurality of electrical consumers which receive a constant control current at the respective control nodes (CH1, CH2, CH3, CH4), comprising:

a transformer unit (10) receiving a regulated and/or constant current of a predetermined frequency has at least one first winding (12) and one second winding (14) on the secondary side having a shared pickup, a first choke of a first choke arrangement (70, 72), which is connected to a first one (CH1) of the control nodes via rectifiers (D1) is connected downstream from the first winding, and a third choke of the first choke arrangement is also connected downstream and is connected to a second one of the control nodes (CH2) via rectifiers (D2), a second choke of the first choke arrangement, which is connected to the first one (CH1) of the control nodes via rectifiers (D1), is connected downstream from the second winding, and a fourth choke of the first choke arrangement is connected downstream from the second winding and is connected to the second one (CH2) of the control nodes via rectifiers (D2), one oppositely wound choke of a second choke arrangement (80, 82) is connected upstream from the second and fourth chokes, said choke arrangement being provided between the first and/or second windings of the transformer unit on the secondary side, said chokes of the first choke arrangement being connected to the respective control nodes and being oppositely wound from one another, and the chokes of the first choke arrangement and the chokes of the second choke arrangement are each coupled magnetically to one another, in particular having a common choke core.

13. The device according to claim 12, wherein a respective circuit branch is formed for each of the control nodes having the chokes of the first choke arrangement connected to the respective control nodes and having the first and second windings of the transformer unit on the secondary side, wherein for separating the circuit branches from one another, the first windings on the secondary side (12*i*') and the second windings (14*i*') on the secondary side of the transformer unit (10) are each separated from one another and insulated.

14. The device according to claim 1, wherein the plurality of the electrical consumers has a plurality of chargeable batteries and/or accumulators or a plurality of electric motors or plurality of galvanic plants.

15. The device according to claim 1, wherein the plurality of the electrical consumers are free of any semiconductor-based lamps and/or organic lamps.

* * * * *